United States Patent

Seo et al.

(10) Patent No.: US 10,185,364 B2
(45) Date of Patent: Jan. 22, 2019

(54) ELECTRONIC DEVICE

(71) Applicant: Samsung Electronics Co., Ltd., Suwon-si, Gyeonggi-do (KR)

(72) Inventors: Ho-seong Seo, Suwon-si (KR); Jin-hyoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 299 days.

(21) Appl. No.: 15/074,282

(22) Filed: Mar. 18, 2016

(65) Prior Publication Data

US 2016/0357222 A1    Dec. 8, 2016

Related U.S. Application Data

(60) Provisional application No. 62/171,348, filed on Jun. 5, 2015.

(30) Foreign Application Priority Data

Oct. 22, 2015  (KR) ........................ 10-2015-0147552

(51) Int. Cl.
*G06F 1/16* (2006.01)

(52) U.S. Cl.
CPC ............ *G06F 1/1652* (2013.01); *G06F 1/163* (2013.01); *G06F 1/1635* (2013.01); *G06F 1/1656* (2013.01)

(58) Field of Classification Search
CPC ........... A44C 5/08; A44C 5/0076; A44C 5/12; A44C 5/025; A44C 5/10; A44C 5/102; A44C 5/105; A44C 5/107; A44C 5/0061; A44C 5/14; A44C 5/16; A44C 5/22; G04G 17/02; G04G 17/083; H05K 5/0017; H04M 1/0268; H01L 51/0097; F16F 1/027; G02F 1/133308; Y02E 10/549; G06F 1/1652; G06F 1/163; G06F 1/1635; G06F 1/1656
USPC ........................................................ 63/8, 11
See application file for complete search history.

(56) References Cited

U.S. PATENT DOCUMENTS

| 1,313,644 | A | * | 8/1919 | Simon ....................... A44C 5/22 224/176 |
|---|---|---|---|---|
| 5,515,491 | A | | 5/1996 | Bates et al. |
| 7,949,633 | B1 | | 5/2011 | Shaver et al. |
| 8,116,444 | B2 | | 2/2012 | Pearson et al. |
| 8,370,998 | B2 | * | 2/2013 | Han ...................... A44B 11/008 24/265 WS |
| 8,893,938 | B2 | * | 11/2014 | Grossenbacher ........ A44C 5/14 224/167 |
| 9,285,776 | B1 | * | 3/2016 | Custer .................... G04B 37/22 |
| 2013/0044215 | A1 | * | 2/2013 | Rothkopf ................ G06F 1/163 348/143 |

(Continued)

FOREIGN PATENT DOCUMENTS

KR    10-2015-0035232 A    4/2015

*Primary Examiner* — Jack W Lavinder
(74) *Attorney, Agent, or Firm* — Jefferson IP Law, LLP

(57) ABSTRACT

An electronic device is provided. The electronic device includes a body including a plurality of segment members connected to each other to be rotatable, the body being configured to switch to a flat state or a bent state by rotations of the plurality of segment members, a flexible display device supported by the body, a return spring configured to maintain the body in the bent state with an elastic force so that the body returns to the flat state, and a locking unit configured to lock the body at various bent states with different curvatures.

14 Claims, 18 Drawing Sheets

(56) References Cited

U.S. PATENT DOCUMENTS

| | | | |
|---|---|---|---|
| 2014/0003006 A1* | 1/2014 | Ahn | G06F 1/1652 361/749 |
| 2014/0099479 A1* | 4/2014 | Krall | B32B 3/14 428/174 |
| 2015/0089974 A1 | 4/2015 | Seo et al. | |
| 2015/0277489 A1* | 10/2015 | Lin | G06F 1/163 361/679.03 |

* cited by examiner

ELECTRONIC DEVICE

CROSS-REFERENCE TO RELATED APPLICATION(S)

This application claims the benefit under 35 U.S.C. § 119(e) of a U.S. Provisional application filed on Jun. 5, 2015 in the U.S. Patent and Trademark Office and assigned Ser. No. 62/171,348, and under 35 U.S.C. § 119(a) of a Korean patent application filed on Oct. 22, 2015 in the Korean Intellectual Property Office and assigned Serial No. 10-2015-0147552, the entire disclosure of each of which is hereby incorporated by reference.

TECHNICAL FIELD

The present disclosure relates to electronic devices capable of transforming between a bent state and a flat state.

BACKGROUND

Electronic devices such as communication devices, game devices, multimedia devices, portable computers, and imaging devices include display devices for displaying image information. Electronic devices commonly have foldable structures such that the electronic devices may be folded into a smaller size for portability. In such electronic devices, two bodies are connected by a foldable structure. Since display devices of the related art have structures that are not foldable, the display devices may be disposed in either of the two bodies. Accordingly, it is difficult to produce electronic devices having a foldable structure and wide display devices.

Recently, as bendable flexible display devices have been developed, research is being conducted into applying the flexible display devices to wearable devices or stationary type electronic devices that may be worn on a human body, for example, on the wrist or the like, due to the transformation capabilities of the wearable devices between an annularly bent state and a flat state.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide electronic devices that are bendable with various curvatures.

In accordance with an aspect of the present disclosure, an electronic device is provided. The electronic device includes a body including a plurality of segment members that are connected to each other to be rotatable, the body being configured to switch to a flat state or a bent state by rotations of the plurality of segment members, a flexible display device supported by the body, a return spring configured to maintain the body in the bent state with an elastic force so that the body returns to the flat state, and a locking unit configured to lock the body at various bent states with different curvatures.

The locking unit may include a wire having an end portion connected to a first end segment member that is located at an end from among the plurality of segment members, and penetrating through the plurality of segment members to extend to a second end segment member that is located at another end from among the plurality of segment members, and a pulley provided on the second end segment member to be rotatable so that another end portion of the wire is connected thereto, wherein the locking unit may selectively allow the pulley to rotate in a direction of unwinding the wire to lock the body at the various bent states.

The locking unit may include a first elastic member configured to provide the pulley with an elastic force in a direction of winding up the wire, a plurality of hooks provided on the pulley, and a hook lever configured to switch between a locking position, on which the hook lever is hooked by the plurality of hooks to prevent the pulley from rotating in a direction of unwinding the wire, and an unlock position, on which the hook lever is released from the plurality of hooks.

The plurality of hooks may switch the hook lever to the unlock position when the pulley rotates in a direction of winding up the wire.

The locking unit may further include a second elastic member configured to provide the hook lever with an elastic force in a direction of locating the hook lever at the unlock position, and a release button configured to switch the hook lever to the unlock position.

The return spring may have an initial deformation amount when the body is in the flat state.

The return spring may include a hyperelastic material.

The plurality of segment members may include a first segment member, and a plurality of second segment members and a plurality of third segment members located at opposite sides of the first segment member, wherein at least one of a length and a width of the first segment member may be greater than lengths or widths of the second and third segment members.

The flexible display device may be supported by the first segment member.

The flexible display device may include a first device, a second device, and a third device that are respectively supported by the first to third segment members.

A first end segment member and a second end segment member, from among the plurality of segment members, may be respectively located at opposite ends of the plurality of segment members, and the electronic device may further include a first band and a second band configured to be respectively connected to the first end segment member and the second end segment member, and a buckle configured to connect the first band to the second band.

A first end segment member and a second end segment member, from among the plurality of segment members, may be respectively located at opposite ends of the plurality of segment members, and the electronic device may further include elastic bands respectively connected to the first end segment member and the second end segment member and elastically transformed.

The electronic device may further include a controller configured to control the flexible display device and including a plurality of electric circuit devices electrically connected to each other via flexible electric connection members, and a battery configured to supply power to the controller and including a plurality of battery modules that are electrically connected to each other via flexible electric connection members, wherein the body may include an accommodation space for accommodating the controller and the battery.

The accommodation space may be formed by segment accommodation portions included in the plurality of segment members.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, embodiments of an electronic device are described with reference to the enclosed drawings. A size (e.g., a thickness) of each component may be exaggerated for clarity of the description. As used herein, the term "and/or" includes any and all combinations of one or more of the associated listed items. Expressions such as "at least one of," when preceding a list of elements, modify the entire list of elements and do not modify the individual elements of the list.

Figure 1:
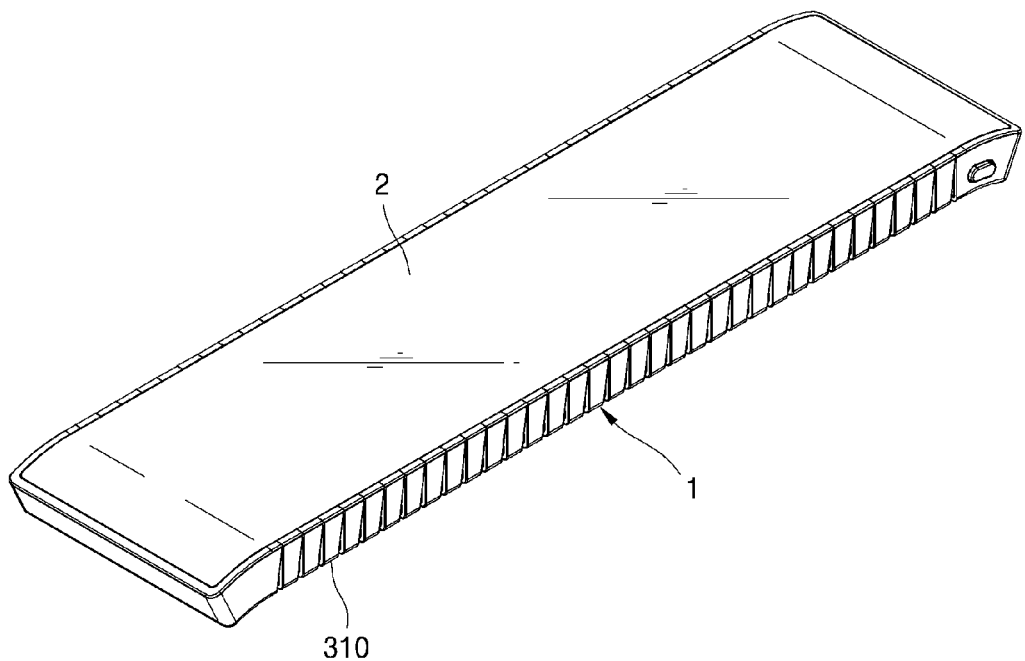
FIG. 1 is an external perspective view of an electronic device according to an embodiment of the present disclosure.
Figure 2:
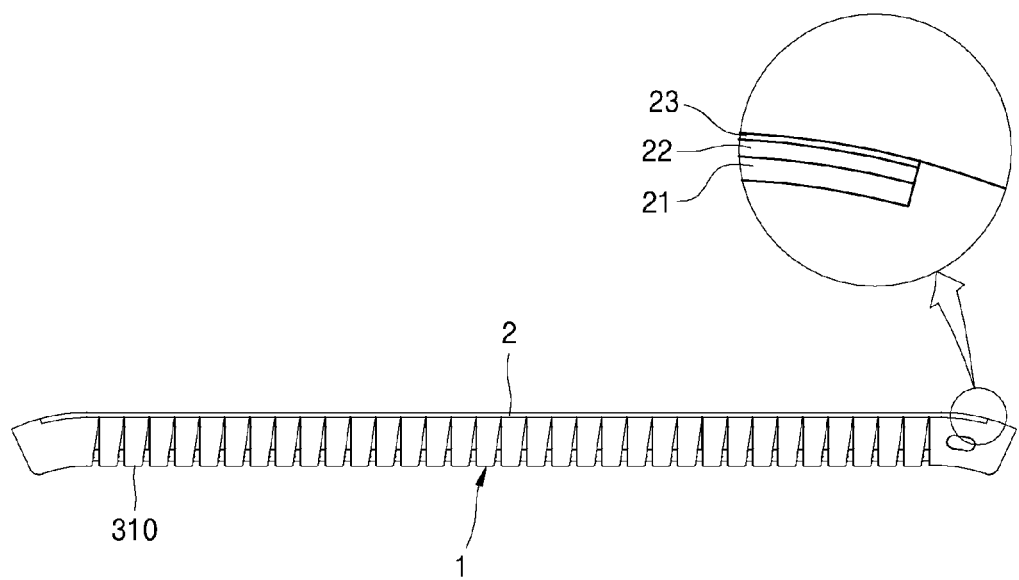
FIG. 2 is a side view of the electronic device of FIG. 1 in a flat state according to an embodiment of the present disclosure.
Figure 3:
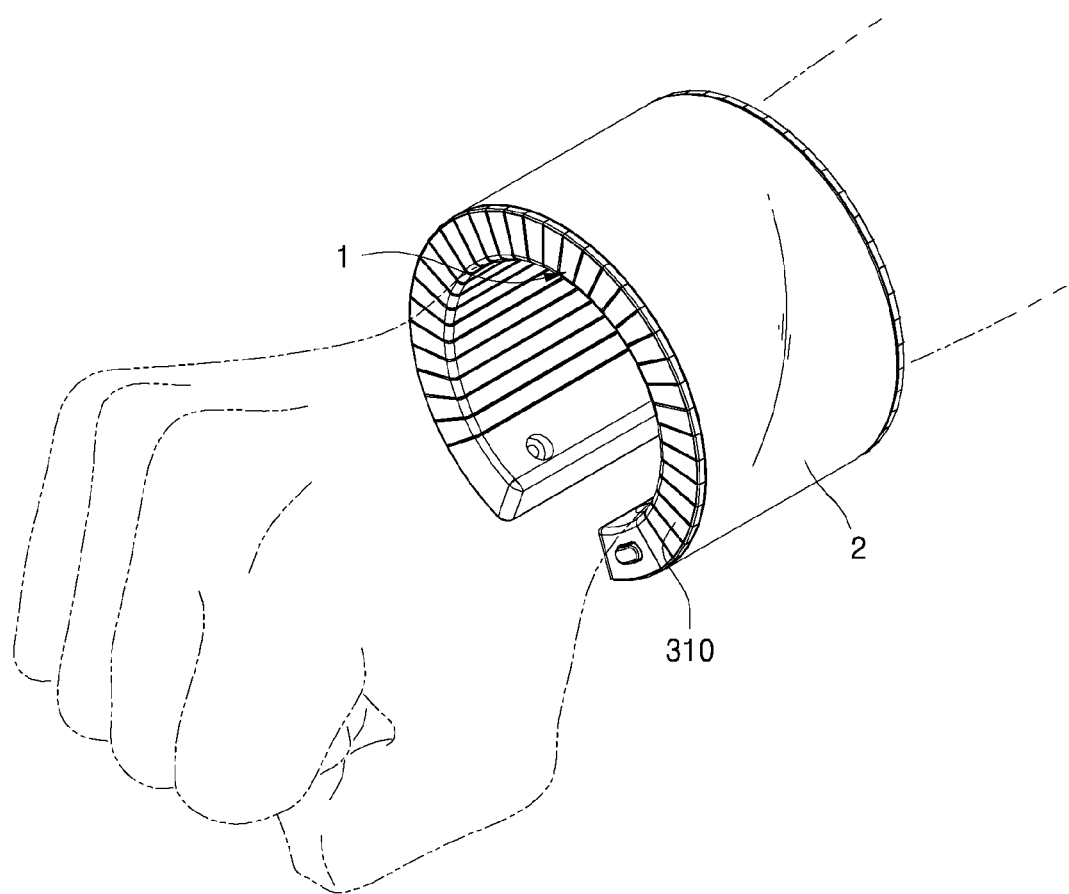
FIG. 3 is a side view of the electronic device of FIG. 1 in a bent state according to an embodiment of the present disclosure.

FIG. 1 is an external perspective view of an electronic device according to an embodiment of the present disclosure, FIG. 2 is a side view of the electronic device shown in FIG. 1 in a flat state according to an embodiment of the present disclosure, and FIG. 3 is a side view of the electronic device shown in FIG. 1 in a bent state according to an embodiment of the present disclosure.

Referring to FIGS. 1 to 3, the electronic device includes a body 1 that may be transformed between an annularly bent state and a flat state and a flexible display device 2 supported on a top surface of the body 1. The electronic device may be an electronic device that may be portable or wearable, such as a communication device, a game device, a multimedia device, a portable computer, and an imaging device, or a stationary type electronic device.

The flexible display device 2 may include a flexible display panel 21 that displays an image and a transparent protection panel 23 disposed on an outer side of the flexible display panel 21 as illustrated in FIG. 2. Also, the flexible display device 2 may further include a touch panel 22 as an input unit. The touch panel 22 may be disposed between the transparent protection panel 23 and the flexible display panel 21. Also, the flexible display device 2 may further include various optical panels or optical films.

The body 1 may include a processor (not shown) that performs functions according to the purpose of an electronic device and an input/output unit (not shown). When the electronic device is a multimedia device for watching images or listening to music, the processor may include an image/audio information processor. When the electronic device is a communication device, the processor may include a communication module. The input/output unit may include an image/audio input and output unit and a manipulator (not shown) for a user to manipulate. The manipulator may be implemented by the touch panel 22 integrated in the flexible display device 2.

As shown in FIG. 3, the electronic device may be annularly bent, wherein the body 1 supports the flexible display device 2 from an inner surface of the flexible display device 2 to be annularly bent with a curvature. As the electronic device is annularly bent, the electronic device may be worn on a human body, for example, on a wrist, or may be installed on a handle of an apparatus such as a bike (not shown), a stroller (not shown), or a shopping cart (not shown), as illustrated in FIG. 3.

For transformations between the flat state and the annularly bent state, the body 1 may include a plurality of segment members 310 sequentially connected to be rotatable. As such, the body 1 may be switched to a flat state or an annularly bent state. Hereinafter, the body 1 switching to the flat state or the bent state according to the embodiment will be described in detail below.

Figure 4:
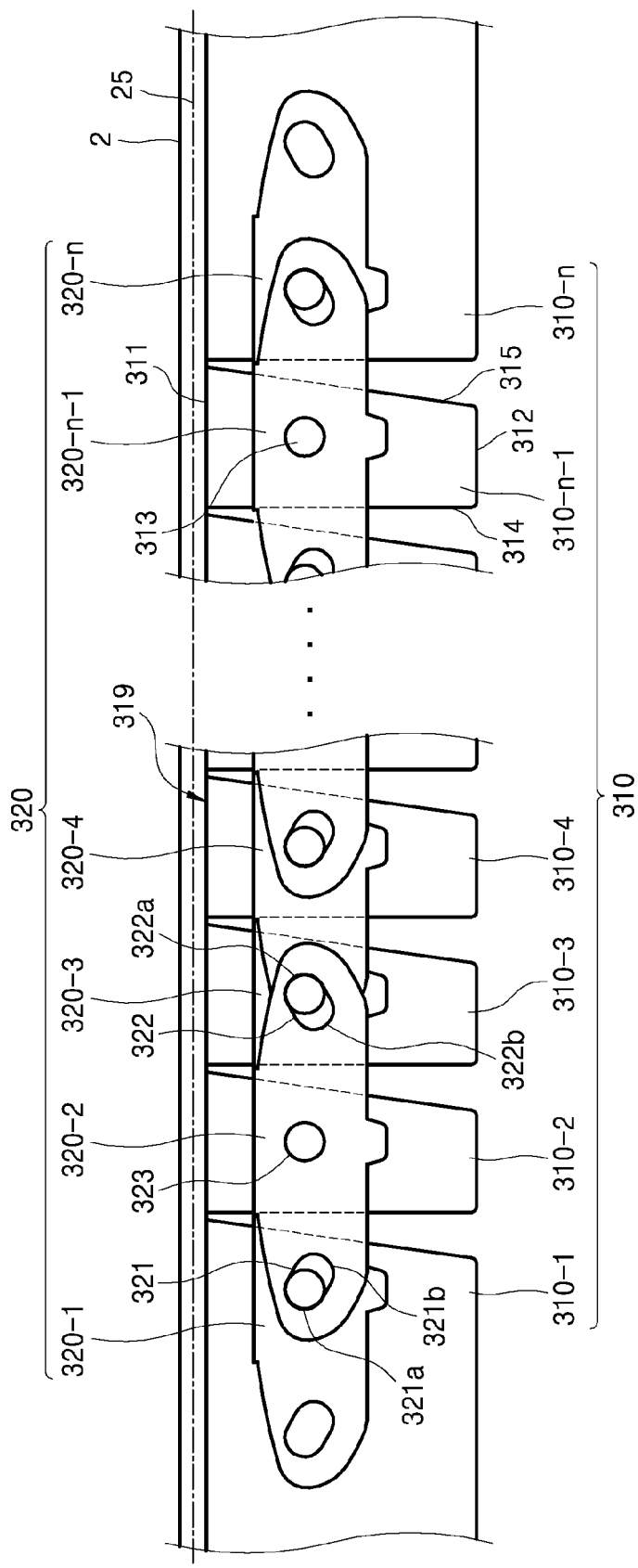
FIG. 4 is a side view of a body of an electronic device in a flat state according to an embodiment of the present disclosure.

FIG. 4 is a side view of a body of an electronic device in a flat state according to an embodiment of the present disclosure.

Referring to FIG. 4, the body 1 includes a plurality of segment members 310-1 . . . 310-n aligned in a length direction L, which is a direction in which the body 1 may be bent. A plurality of connecting members 320-1 . . . 320-n sequentially connect the plurality of segment members 310 to be rotatable. Each of the segment members 310 includes a top portion 311 and a bottom portion 312. The flexible display device 2 is supported on the top portion 311. The top portion 311 and the bottom portion 312 respectively refer to an outer surface and an inner surface of the body 1, based on a direction of bending. A length of the bottom portion 312 is shorter than a length of the top portion 311. The segment member 310 includes a first side portion 314 and a second side portion 315 that connect the top portion 311 to the bottom portion 312. The first side portion 314 is disposed opposite to the second side portion 315 of a neighboring segment member 310. The first side portion 314 forms a wedge shape with the second side portion 315 of a neighboring segment member 310. The top portions 311 of the plurality of segment members 310 form a support surface 319 supporting the flexible display device 2.

The connecting member 320 connects two segment members (rotational segment members) disposed respectively on opposite sides of their corresponding segment member (a reference segment member), such that the two rotational segment members are connected to be rotatable with respect to the reference segment member. To do this, connecting pins 313 are provided on the reference segment member and the rotational segment members. On the connecting member 320, a center hole 323 is provided, in which a connecting pin 313 of the reference segment member is inserted, and first and second guide slots 321 and 322, in which connecting pins 313 of the rotational segment members are inserted, are provided respectively on opposite sides of the center hole 323. The first and second guide slots 321 and 322 guide the rotational segment members by having the reference segment member in the center, such that the bottom portions 312 of the rotational segment members disposed on both sides of the reference segment member rotate in approaching/separating directions with respect to the bottom portion 312 of the reference segment member.

For example, a connection member 320-2 connects rotational segment members 310-1 and 310-3 that are respectively disposed on opposite sides of the reference segmented member 310-2 to the corresponding reference segment member 310-2 such that the rotational segment members 310-1 and 310-3 are rotatable with respect to the reference segment member 310-2. A connecting pin 313 of the reference segment member 310-2 is inserted into a center hole 323 of the connecting member 320-2. The connecting pins 313 of the rotational segment members 310-1 and 310-3 are inserted into the first and second guide slots 321 and 322 of the connecting member 320-2, respectively. The first guide slot 321 includes a first portion 321a that corresponds to a flat state and a second portion 321b that corresponds to an annularly bent state. Similarly, the second guide slot 322 includes a first portion 322a that corresponds to a flat state and a second portion 322b that corresponds to an annularly bent state.

When the body 1 is in a flat state or a bent state, the flexible display device 2 is supported on the support surface 319 that is formed by the top portions 311 of the plurality of segment members 310. When the body 1 is transformed into a flat state, a length of a neutral surface 25, which is, for example, located at the center of a thickness of the flexible display device 2, has to be constantly maintained to minimize stress applied to the flexible display device 2. To do this, the first and second guide slots 321 and 322 may have an arc shape, in which a center thereof is located on the neutral line 25. In case a length of the neutral surface 25 when the body 1 is in an annularly bent state is longer than a length of the neutral surface 25 when the body 1 is in a flat state, a tensile force may be applied to the flexible display device 2, such that the flexible display device 2 may be damaged. Alternatively, in case a length of the support surface 319 when the body 1 is in an annularly bent state is shorter than a length of the support surface 319 when the body 1 is in a flat state, the flexible display device 2 may be lifted off from the support surface 319 and may be bent unevenly.

For example, when the reference segment member 310-2 is used as a reference, the first guide slot 321 of the corresponding connecting member 320-2 may be elongated along a pathway of an arc centered on an intersection between an extended line of the second side portion 315 of the rotational segment member 310-1 and the neutral surface 25 or an intersection between the first side portion 314 of the reference segment member 310-2 and the neutral surface 25. The extended line of the second side portion 315 of the rotational segment member 310-1 and the extended line of the first side portion 314 of the reference segment member 310-2 may meet the neutral surface 25 at an intersection, wherein the first guide slot 321 of the connecting member 320-2 may extend along the pathway of the arc centered on the intersection. Also, the second guide slot 322 of the connecting member 320-2 may extend along a pathway of an arc centered on an intersection between an extended line of the second side portion 315 of the reference segment member 310-2 and the neutral surface 25 or an intersection between an extended line of the first side portion 314 of the rotational segment member 310-3 and the neutral surface 25. The extended line of the second side portion 315 of the reference segment member 310-2 and the extended line of the first side portion 314 of the rotational segment member 310-3 and the neutral surface 25 meet at an intersection, wherein the second guide slot 322 of the connecting member 320-2 may extend along a pathway of an arc centered on the intersection. According to the features described above, a length of the neutral surface 25 of the flexible display device 2 may not change when the body 1 is in a bent state or in a flat state.

Segment members 310-1 and 310-n are disposed on the outermost portion. Since only segment members 310-2 and 310-n−1 are respectively neighboring the segment members 310-1 and 310-n, each of connecting members 320-1 and 320-n corresponding to the segment members 310-1 and 310-n may only include the second guide slot 322 and the first guide slot 321, respectively. However, when manufacturing the electronic device, the connecting members 320-1 to 320-n may be the same to reduce the types of components. In this case, only the second guide slot 322 of the connecting member 320-1 and the connecting pin 313 of the reference segment member 310-2 may be connected and only the first guide slot 321 of the connecting member 320-n and the connecting pin 313 of the segment member 310-n−1 may be connected.

Figure 8:
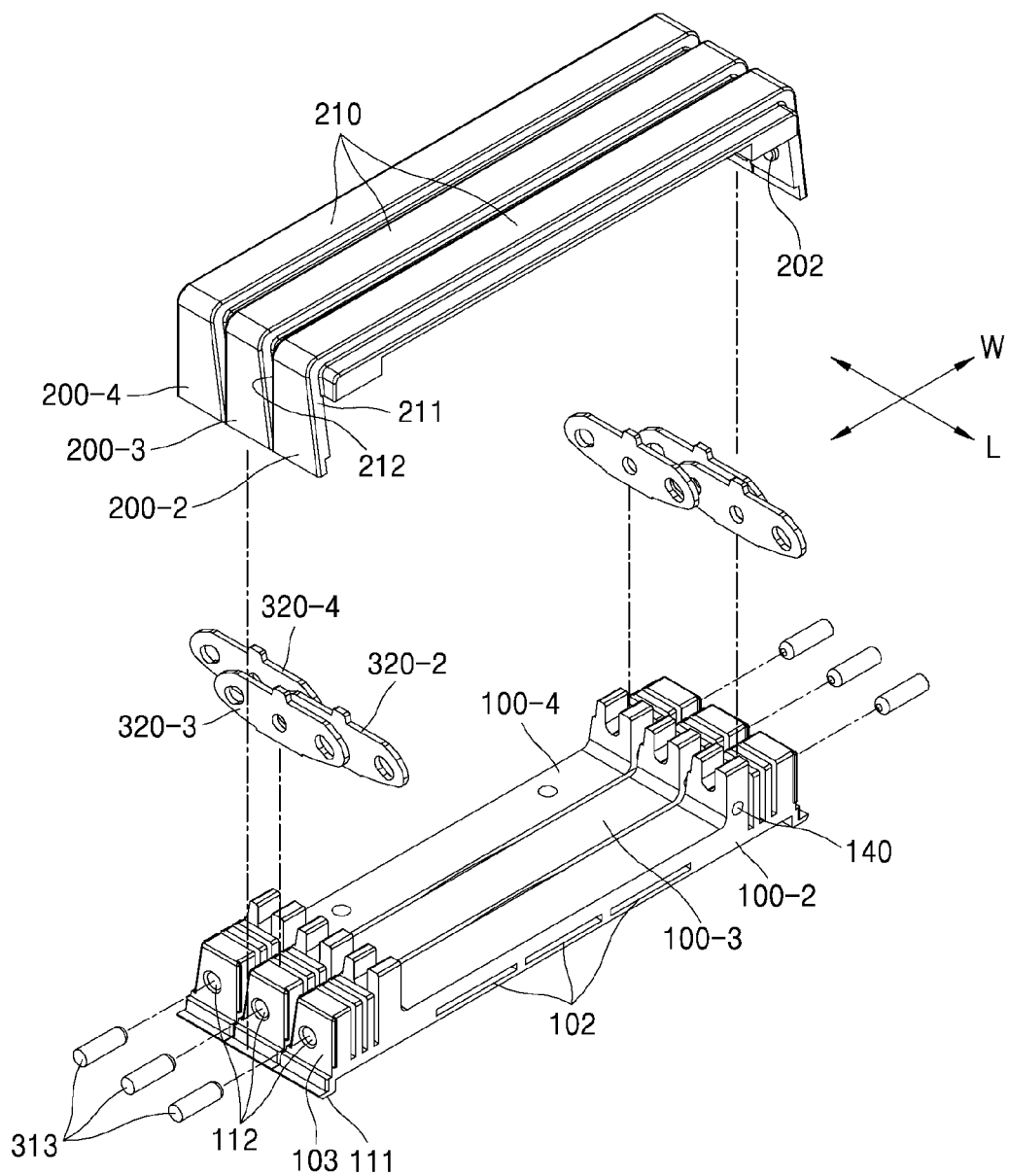
FIG. 8 is an exploded perspective view showing a coupling relation between a top cover and a bottom cover as an example of a segment member according to an embodiment of the present disclosure.

FIG. 4 illustrates a case in which the connecting members 320-1 to 320-n overlap. However, as illustrated in FIG. 8 and discussed below, the connecting members 320-1 to 320-n may be disposed in a zigzag manner in a width direction (W) of the body 1.

When the electronic device is completely flat as illustrated in FIG. 4, each of the connecting pins 313 of the rotational segment members 310-1 and 310-3 may be disposed on the first portions 321a and 322a of the first and second guide slots 321 and 322 of the connecting member 320-2, in other words, on portions disposed away from the center hole 323. In this state, even when a force is applied to bend the body 1 in an opposite direction from a bending direction, the body 1 may not bend because the connecting pins 313 are confined to the first portions 321a and 322a of the first and second guide slots 321 and 322.

When an external force is applied to bend the body 1 in a bending direction, the segment members 310-1 to 310-n may form a triplet pair, such that two rotational segment members disposed respectively on opposite sides of the reference segment member are rotated along the first and second guide slots 321 and 322 of the connecting members corresponding to the reference segment members. In this regard, the connecting pins 313 of the two rotational segment members disposed respectively on opposite sides of the reference segment member are guided by the first and second guide slots 321 and 322.

Figure 5:
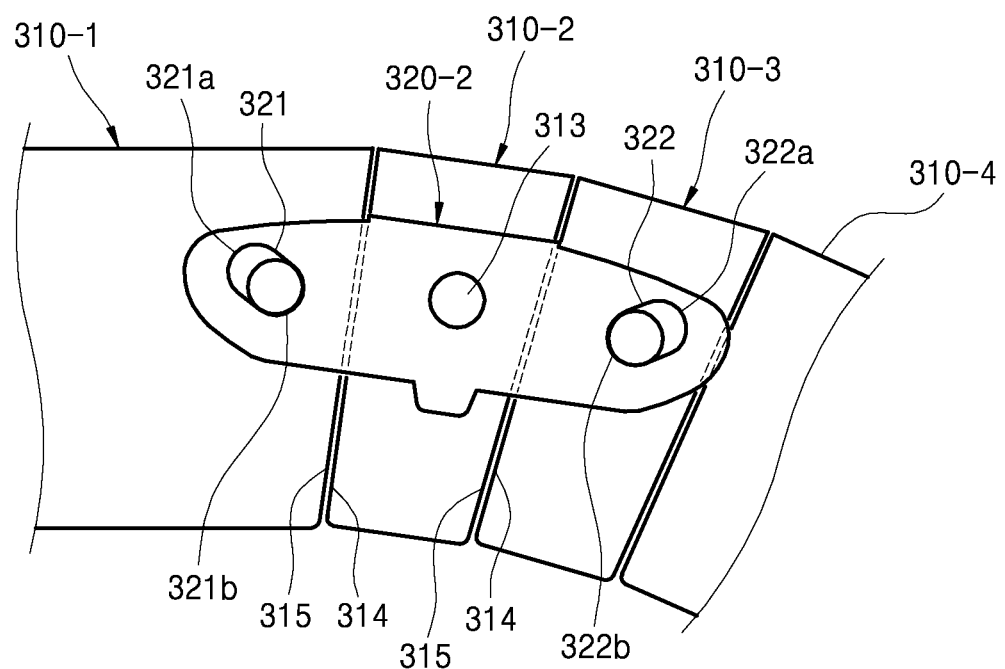
FIG. 5 is a diagram showing an example of a connection between segment members and connecting members when a body is bent according to an embodiment of the present disclosure.

FIG. 5 is a diagram showing an example of a connection between segment members and connecting members when a body is bent according to an embodiment of the present disclosure.

Referring to FIG. 5, the rotational segment members 310-1 and 310-3, respectively disposed on opposite sides of the reference segment member 310-2 are rotated along the first and second guide slots 321 and 322 that are disposed on the connecting member 320-2. The rotation of the rotational segment members 310-1 and 310-3 may occur until the connecting pins 313 of the rotational segment members 310-1 and 310-3 reach the second portions 321b and 322b of the first and second guide slots 321 and 322. When the connecting pins 313 of the rotational segment members 310-1 and 310-3 reach the second portions 321b and 322b of the first and second guide slots 321 and 322, the rotational segment members 310-1 and 310-3 may not rotate any more.

Due to the features described above, each of the plurality of segment members 310 functions as a reference segment member, which acts as a reference for a rotation of rotational segment members disposed respectively on opposite sides thereof, such that the body 1 may be annularly bent as shown in FIG. 3.

When the segment member 310-1 acts as a reference segment member, a neighboring segment member 310-2 is guided to be rotated in an arc direction along the second guide slot 322 of the connecting member 320-1 and when the segment member 310-3 acts as a reference segment member, the segment members 310-2 and 310-4 disposed respectively on opposite sides of the segment member 310-3 are guided to be rotated in an arc direction along the first and second guide slots 321 and 322 of the connecting member 320-3.

The body 1 according to an embodiment includes the segment members 310-1 to 310-n, each of which acts as a reference segment member. Thus, the segment members 310-1 to 310-n are mutually confined, such that the segment members 310-1 to 310-n sequentially rotate along the first and second guide slots 321 and 322 of the corresponding connecting members 320. Accordingly, the support surface 319 formed by the top portions 311 of the plurality of segment members 310 may have a uniform curvature in an annularly bent state.

Figure 6:
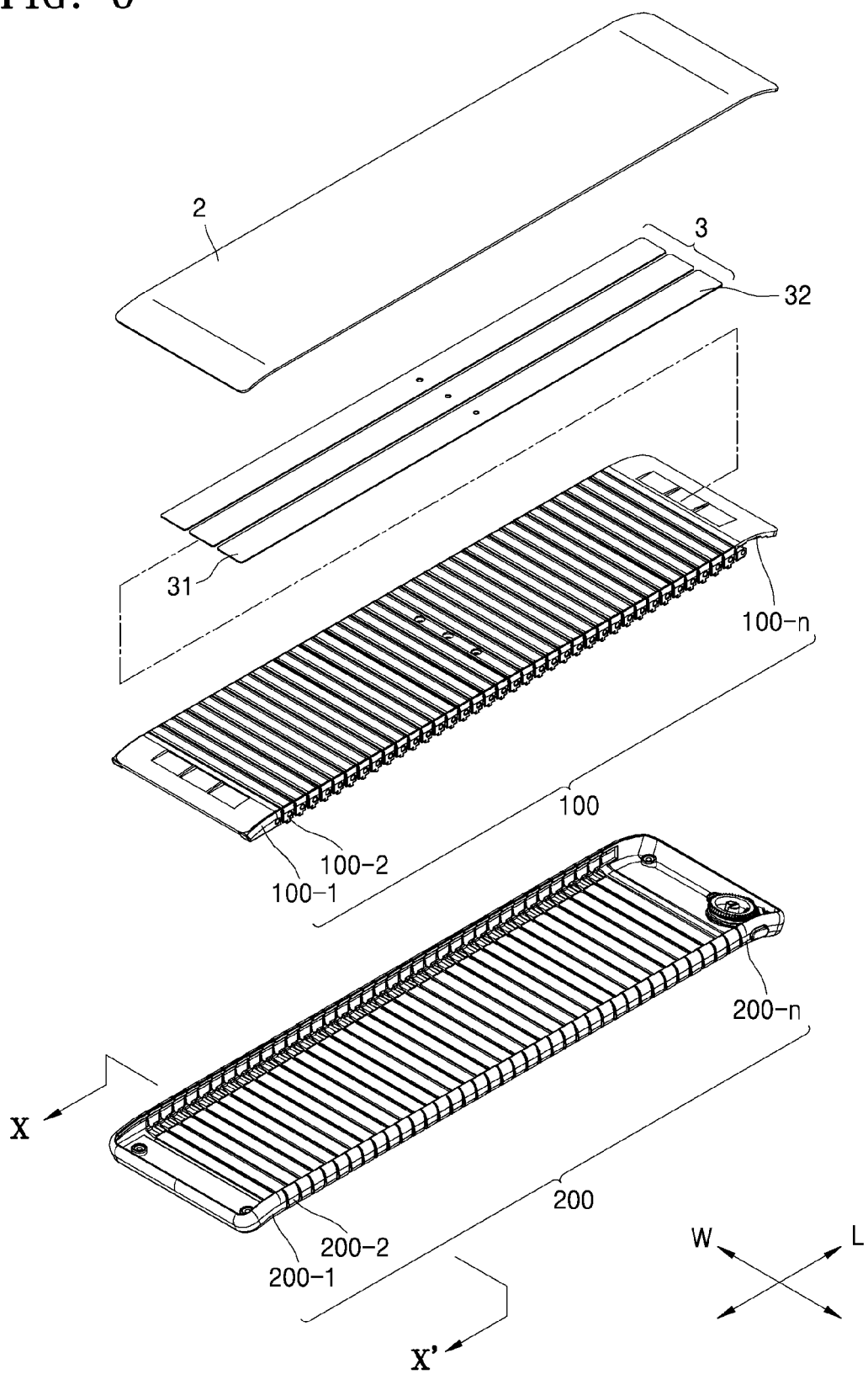
FIG. 6 is an exploded perspective view of an electronic device according to an embodiment of the present disclosure.
Figure 7:
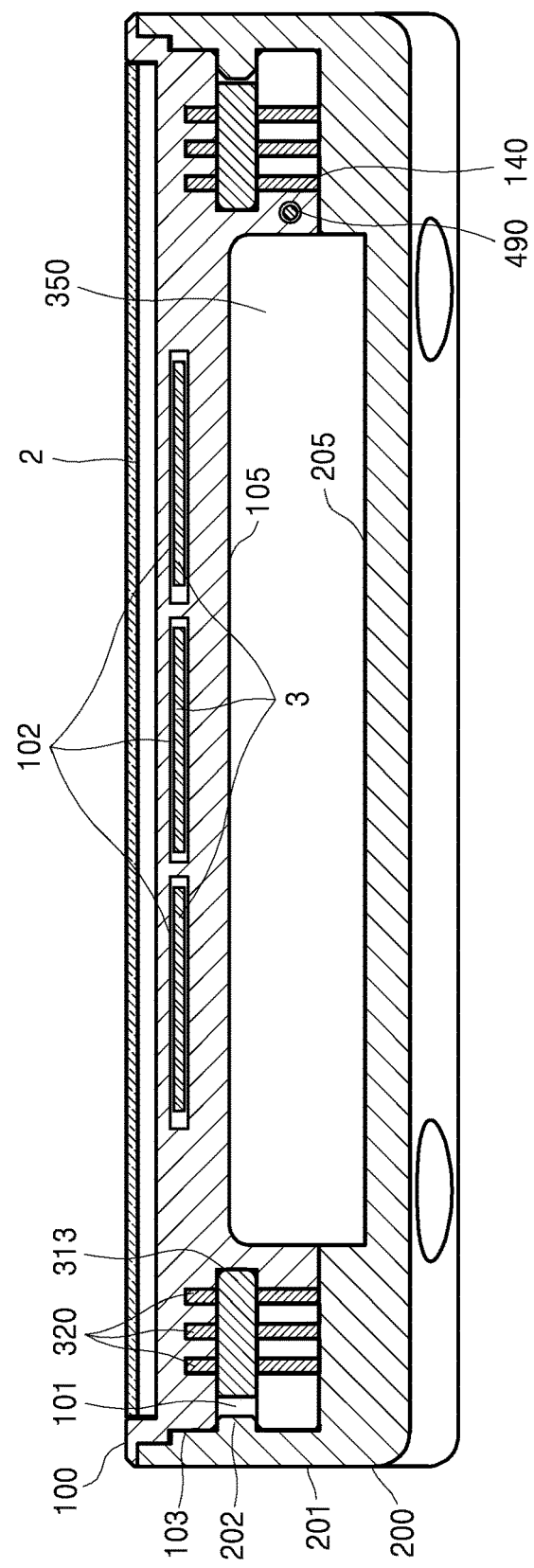
FIG. 7 is a cross-sectional view of the electronic device taken along a line X-X' of FIG. 6 according to an embodiment of the present disclosure.

FIG. 6 is an exploded perspective view of an electronic device according to an embodiment of the present disclosure. FIG. 7 is a cross-sectional view taken along line X-X' of FIG. 6 according to an embodiment of the present disclosure.

Referring to FIG. 6, the electronic device includes the body 1, the flexible display device 2 coupled to the top surface of the body 1, and a return spring 3 provided across the body 1. In FIG. 6, three return springs 6 arranged in a width direction W of the body 1, but if necessary, two or less or four or more return springs 3 may be arranged in the width direction W of the body 1. The return spring 3 includes an end portion 31 and another end portion 32.

The body 1 includes a plurality of top covers 100 (i.e., 100-1 . . . 100-n) and a plurality of bottom covers 200 (i.e., 200-1 . . . 200-n) respectively corresponding to the plurality of top covers 100. The plurality of top covers 100 and the plurality of bottom covers 200 are coupled to each other to form the plurality of segment members 310 as shown in FIG. 4. For example, top covers 100-1 to 100-n and bottom covers 200-1 to 200-n are coupled to each other to form the segment members 310-1 to 310-n as illustrated in FIG. 4.

Referring to FIG. 7, protruding pins 202 protrude inwardly from opposite side walls 201 of the bottom cover 200. The top cover 100 includes concave portions 101 that receive the protruding pins 202. The top cover 100 and the bottom cover 200 may be coupled to each other by fitting the protruding pins 202 into the concave portions 101 while slightly opening the opposite side walls 201 of the bottom cover 200 outwardly. The coupling manner of the top cover 100 and the bottom cover 200 illustrated in FIG. 7 is an example, and the embodiments are not limited thereto. For example, although not shown in the drawings, the top cover 100 and the bottom cover 200 may be coupled to each other via a coupling member such as a screw.

FIG. 8 is an exploded perspective view showing a coupling relation between a top cover and a bottom cover according to an embodiment of the present disclosure. FIG. 8 illustrates top covers 100-2, 100-3, and 100-4 and bottom covers 200-2, 200-3, and 200-4 respectively corresponding to segment members 310-2, 310-3, and 310-4, according to an embodiment.

Referring to FIG. 8, top portions 111 of the top covers 100-2, 100-3, and 100-4 correspond to top portions 311 of the segment members 310-2, 310-3, and 310-4, respectively. Bottom portions 210 of the bottom covers 200-2, 200-3, and 200-4 correspond to bottom portions 312 of the segment members 310-2, 310-3, and 310-4, respectively. Also, the first and second side portions 211 and 212 of the bottom covers 200-2, 200-3, and 200-4 respectively correspond to the first and second side portions 314 and 315 of the segment members 310-2, 310-3, and 310-4.

Connecting members 320-2, 320-3, and 320-4 are coupled to the top covers 100-2, 100-3, and 100-4 by using connecting pins 313 to form the segment members 310-2, 310-3, and 310-4 such that the segment members 310-2, 310-3, and 310-4 are capable of being mutually rotated. Insertion holes 112, through which the connecting pins 313 are inserted, are formed in the top covers 100-2, 100-3, and 100-4, respectively. The connecting members 320-2, 320-3, and 320-4, which respectively correspond to the top covers 100-2, 100-3, and 100-4, are disposed in a perpendicular direction to an alignment direction of the top covers 100-2, 100-3, and 100-4, and the connecting pins 313 are inserted into the insertion holes 112, such that the top covers 100-2, 100-3, and 100-4 and the connecting members 320-2, 320-3, and 320-4 are coupled together.

Referring back to FIG. 7, the connecting pins 313 are deeply inserted into the insertion holes 112, such that a space of the insertion hole 112 between a side wall 103 and a terminal end of the connecting pin 313 may be used as a concave portion 101 that receives the protrusion pin 202 of the bottom cover 200. Accordingly, a structure of the top cover 100 may be simplified.

The segment members 310-1 to 310-n may have a shape in which the interior of the electronic device is not externally exposed while the body 1 is in a flat state or an annularly bent state. To do this, the segment members 310-1 to 310-n have a structure (sunken portion 234 of FIGS. 9A to 9D) which receives a portion (an extended portion 232 of FIGS. 9A to 9D) of the neighboring segment members 310-1 to 310-n in the length direction L. For example, the structure described above may be formed on the bottom covers 200 that form the segment members 310.

Figure 9A:
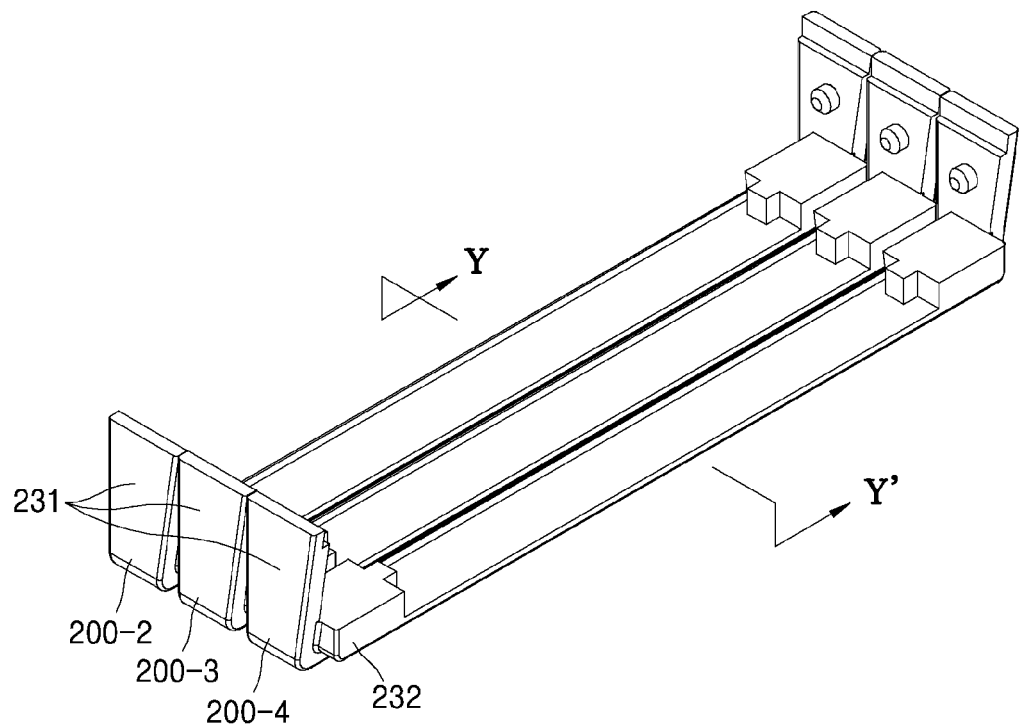
FIG. 9A is a perspective view of a bottom cover according to an embodiment of the present disclosure.
Figure 9B:
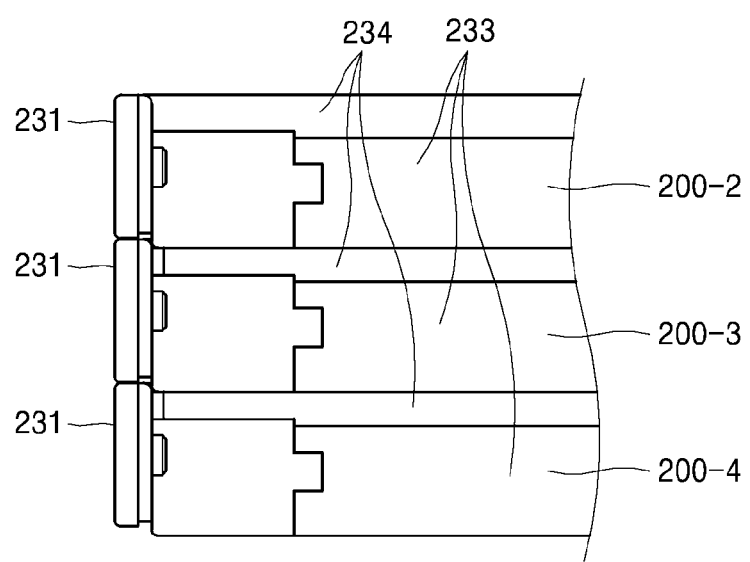
FIG. 9B is a plan view of the bottom cover of FIG. 9A according to an embodiment of the present disclosure.
Figure 9C:
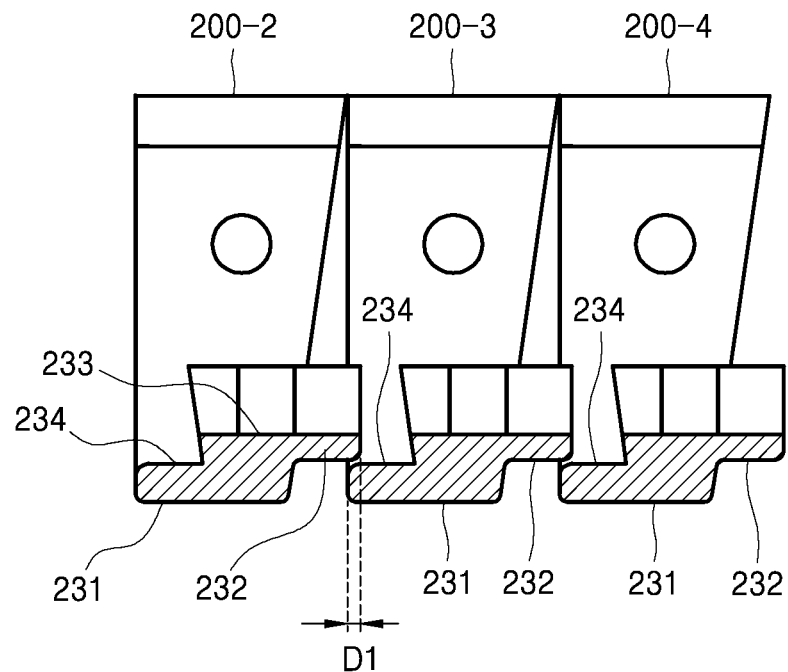
FIG. 9C is a cross-sectional view taken along a line Y-Y' of FIG. 9A, wherein a body is in a completely flat state according to an embodiment of the present disclosure.
Figure 9D:
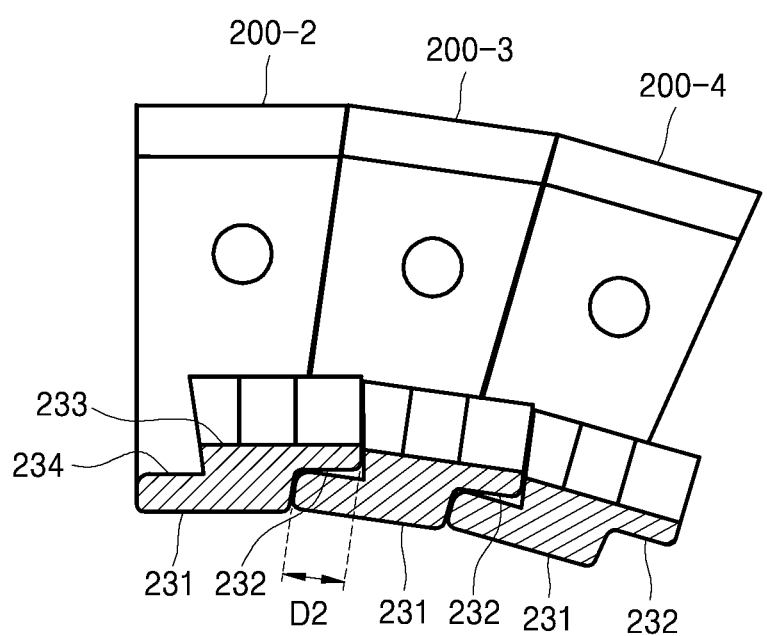
FIG. 9D is a cross-sectional view taken along the line Y-Y' of FIG. 9A, wherein a body is completely in a annularly bent state according to an embodiment of the present disclosure.

FIG. 9A is a perspective view of a bottom cover according to an embodiment of the present disclosure. FIG. 9B is a plan view of the bottom cover of FIG. 9A according to an embodiment of the present disclosure. FIG. 9C is a cross-sectional view taken along line Y-Y' of FIG. 9A according to an embodiment of the present disclosure, wherein the body 1 is in a completely flat state. FIG. 9D is a cross-sectional view taken along line Y-Y' of FIG. 9A according to an embodiment of the present disclosure, wherein the body 1 is in an annularly bent state.

Referring to FIGS. 9A to 9C, each of the bottom covers 200-1 to 200-n includes an extended portion 232 that is inwardly stepped from an external surface 231 and extends to be overlapped with a neighboring bottom cover disposed on one side in the length direction L. For example, the extended portion 232 may extend from each second side portion 315 of the bottom covers 200-1 to 200-n towards a first side portion 314 of the neighboring bottom cover. Also, each of the bottom covers 200-1 to 200-n includes a sunken portion 234 that is disposed on an opposing side of the extended portion 232 in the length direction L, in other words, on a side of the first side portion 314, and is sunken from an internal surface 233 to receive an extended portion 232 of another neighboring bottom cover disposed on another side in the length direction L. Accordingly, a gap between two neighboring bottom covers may be covered by the extended portion 232.

The extended portion 232 of the bottom covers 200-1 to 200-n and the sunken portions 234 of other neighboring bottom covers 200-1 to 200-n maintain a state in which at least some portions thereof overlap in the length direction L when the bottom covers 200-1 to 200-n are in a flat state or annularly bent state. For example, FIGS. 9A to 9C illustrate three bottom covers 200-2, 200-3, and 200-4. The extended portions 232 of the bottom covers 200-2 and 200-3 are disposed in the sunken portions 234 of the bottom covers 200-3 and 200-4. An overlapping length of the extended portion 232 and the sunken portion 234 is D1 when the body 1 is in a completely flat state.

Referring to FIG. 9D, the extended portions 232 of the bottom covers 200-2 and 200-3 are disposed in the sunken portions 234 of the bottom covers 200-3 and 200-4 when the body 1 is in an annularly bent state, wherein an overlapping length is D2, which is longer than D1. As described above, at least one portion of the extended portion 232 is disposed in the sunken portion 234, when the body 1 is in a flat state or an annularly bent state and thus, a gap does not form between neighboring bottom covers 200. Accordingly, the inside of the electronic device is not externally exposed. Due to the features described above, the appearance of the wearable device may be improved and the risk of breakdown caused by mingling of impurities may be reduced.

The return spring 3 is provided across the body 1. The return spring 3 penetrates through the plurality of segment members 310. For example, as shown in FIG. 7, the top cover 100 may include penetration slots 102, through which the return spring 3 passes. The return spring 3 passes through the penetration slots 102 in the plurality of top covers 100. Although the length of the neutral surface 25 of the flexible display device 2 does not vary, internal and external lengths of the body 1 based on the neutral surface 25 vary when the body 1 is in the flat state or in the annularly bent state. Thus, at least one of the end portion 31 and the other end portion 32 of the return spring 3 is a free end. The return spring 3 may be fixed on one of the top covers 100-1 to 100-n.

The return spring 3 provides the body 1 with an elastic force in a direction in which the body 1 switches to the flat state from the bent state. The return spring 3 may provide an initial elastic force to the body 1 for maintaining the flat state.

Figure 10:
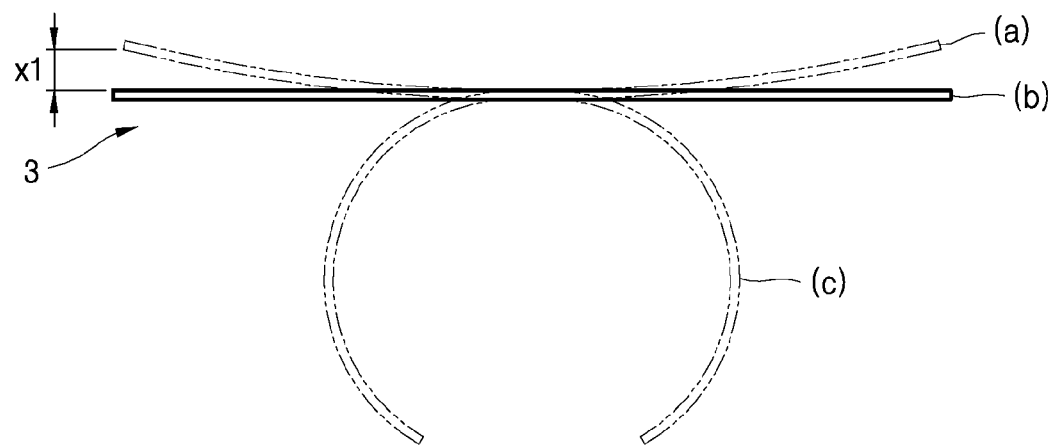
FIG. 10 is a schematic side view of a return spring according to an embodiment of the present disclosure.

FIG. 10 is a schematic side view of a return spring according to an embodiment of the present disclosure.

Referring to FIG. 10, the return spring 3 is slightly curved in a direction opposite to a direction in which the body 1 is curved as denoted by (a), in a free state, that is, a state in which there is no load. Therefore, in a state where the body 1 is in the flat state as denoted by (b), the return spring 3 has an initial deformation amount (x1), and accordingly, the initial elastic force for maintaining the flat state of the body 1 may be provided to the body 1. When the body 1 is annularly bent, the return spring 3 is also annularly bent with the body 1 as denoted by (c). In this state, a return force for returning to the flat state is applied to the body 1.

The return spring 3 may include a hyperelastic material. A general metal spring material has a deformation amount that increases according to an increase in an external force. When the deformation amount exceeds an elastic threshold value, a plastic deformation occurs, and thus, the deformation amount does not become "0" even when the external force is removed. However, the hyperelastic material has a deformation amount that increases even if the external force does not increase, when the deformation amount exceeds the elastic threshold value, and the deformation amount becomes "0" when the external force is removed. When the return spring 3 includes the hyperelastic material, at an initial stage of switching the body 1 from the flat state to the bent state, a force necessary to bend the body 1 increases in proportion to the bent amount. However, when the body 1 is bent to a predetermined degree, the body 1 may be completely bent with nearly the same force as before.

The body 1 may be locked as the bent state. The body 1 may be locked at the bent state with a predetermined curvature. To do this, the electronic device includes a locking unit.

Figure 11:
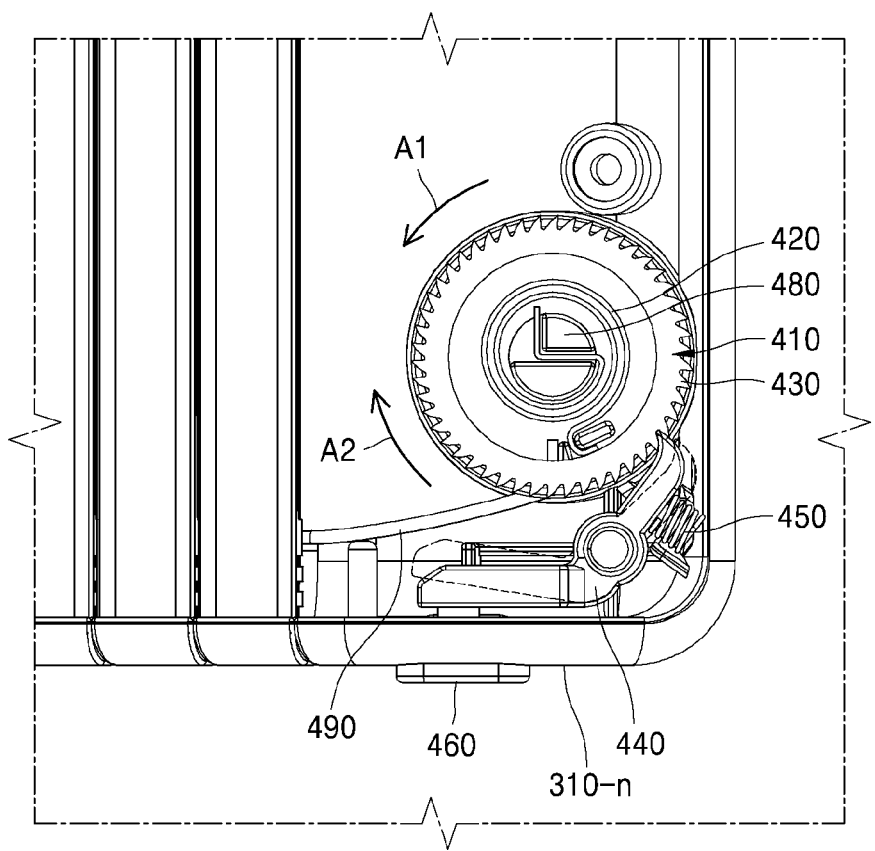
FIG. 11 is a plan view of a locking unit according to an embodiment of the present disclosure.

FIG. 11 is a plan view of the locking unit according to an embodiment of the present disclosure.

Referring to FIG. 11, the locking unit includes a wire 490 and a pulley 410 on which the wire 490 is wound. The wire 490 extends as penetrating through the plurality of segment members 310. As shown in FIGS. 7 and 8, the plurality of top covers 100 may each include a through hole 140, through which the wire 410 penetrates. An end of the wire 490 is connected to a first end segment member 310-1 located at an end from among the plurality of segment members 310, e.g., a top cover 100-1. The pulley 410 is provided to be rotatable at a second end segment member 310-n located at the other end from among the plurality of segment members 310. For example, the pulley 410 may be supported by a support shaft 480 provided on the second end segment member 310-n to be rotatable. A first elastic member 420 provides the pulley 410 with elastic force so that the pulley 410 may rotate in a direction of winding up the wire 490 (a first direction A1). The first elastic member 420 may be, for example, a spiral spring having an end fixed on the support shaft 480 and the other end fixed on the pulley 410.

The pulley 410 includes a plurality of hooks 430. The plurality of hooks 430 may be formed as saw-teeth at an outer circumference of the pulley 410. A hook lever 440 may switch between a locking position (denoted by solid lines) where the hook lever 440 is hooked by the plurality of hooks 430 and an unlock position (denoted by dotted lines) where the hook lever 440 is released from the plurality of hooks 430. For example, the hook lever 440 may be provided on the second end segment member 310-n to be rotated between the locking position and the unlock position. A second elastic member 450 provides the elastic force to the hook lever 440 to be maintained at the locking position.

The hook lever 440 is located at the locking position so as to prevent the pulley 410 from rotating in a second direction A2 in which the wire 490 is unwound. Even when the hook lever 440 is located at the locking position, the rotation of the pulley 410 in the first direction A1 for winding up the wire 490 is allowed. To do this, the plurality of hooks 430 may be formed as saw teeth slanted toward the direction of unwinding the wire 490, that is, the second direction A2. As such, even in a state where the hook lever 440 is located at the locking position, when a rotating force is applied to the pulley 410 in the first direction, the hook lever 440 is pushed by the hooks 430 and switched to the unlock position so as to allow the pulley 410 to rotate in the first direction. When the interference with the hooks 430 is terminated, the hook lever 440 is returned to the locking position by the elastic force of the second elastic member 450.

The wire 490 is located inside of the flexible display device 2 based on the neutral surface 25. When the body 1 is transformed from the flat state to the bent state, the length of the neutral surface 25 does not vary, but a length of the wire 490 occupied by the body 1 is reduced. Therefore, a marginal length is as long as a difference between an initial length of the wire 490, that is, the length of the wire 490 in a state where the body 1 is in the flat state, and the length of the wire 490 occupied by the body 1 in the bent state. As described above, since the pulley 410 is allowed to rotate in the first direction A1, and the elastic force is applied to the pulley 410 to rotate the pulley 410 in the first direction A1 by the first elastic member 420. Therefore, when the body 1 is bent, the pulley 410 rotates in the first direction A1 while winding up the wire 490 as much as the marginal length. When the body 1 is transformed from the bent state to the flat state, the length of the wire 490 occupied by the body 1 increases. Therefore, the wire 490 has to be unwound from the pulley 410. In a state where the hook lever 440 is located at the locking position, the pulley 410 does not rotate in the direction of unwinding the wire 490, that is, the second direction A2. Therefore, the bent state of the body 1 may be fixed by locking the pulley 410 so as not to rotate in the second direction A2.

In order to transform the body 1 to the flat state, the hook lever 440 is switched to the unlock position. To do this, the body 1, e.g., the second end segment member 310-n, may include a release button 460. When a user pushes the release button 460, the hook lever 440 rotates in a direction opposite to a direction in which the elastic force of the second elastic member 450 is applied to be switched to the unlock position, and the pulley 410 is allowed to rotate in the second direction A2. Therefore, the body 1 may be transformed to the flat state. The return spring 3 applies the elastic force to the body 1 in a direction of switching to the flat state. Therefore, when the release button 460 is pushed, the body 1 is returned to the flat state by the elastic force of the return spring 3.

According to the above-described structure, the body 1 may be locked in variously bent states with different curvatures.

Figure 12:
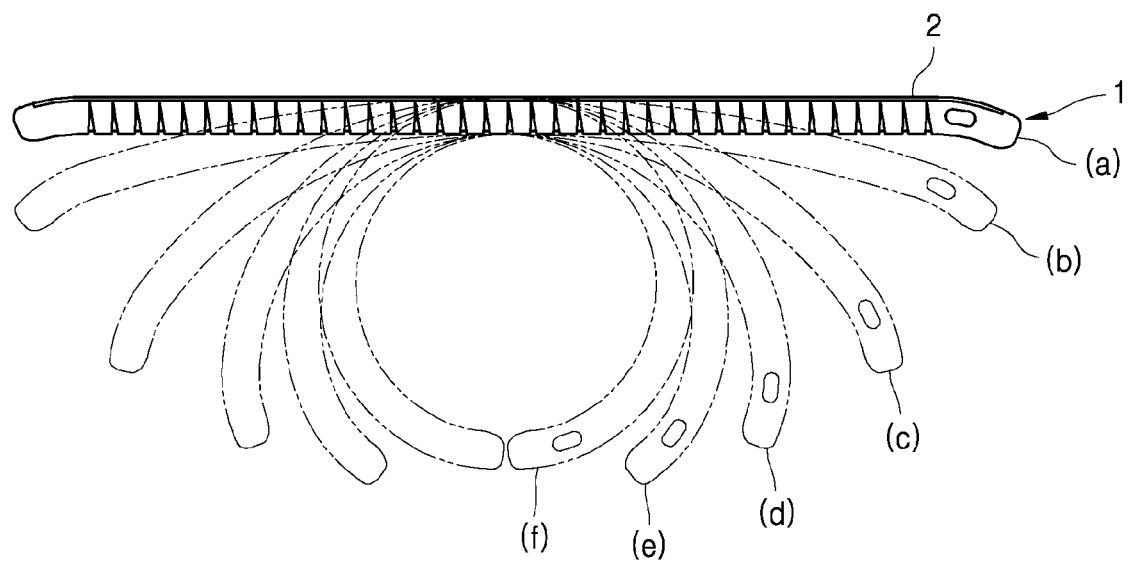
FIG. 12 is a schematic plan view of various states of a body according to an embodiment of the present disclosure.

FIG. 12 is a schematic plan view of various states of a body according to an embodiment of the present disclosure.

Referring to FIG. 12, as denoted by (a), the hook lever 440 is maintained at the locking position by the elastic force of the second elastic member 450 in a state where the body 1 is in the flat state. The body 1 is maintained at the flat state by the elastic force of the return spring 3. In this state, when the body 1 is bent, the wire 490 may have the marginal length. The first elastic member 420 applies the elastic force to the pulley 410 so as to rotate the pulley 410 in the first direction A1. The hook lever 440 interferes with the hooks 430 to repeatedly switch to the locking position and to the unlock position where the rotation of the pulley 410 in the first direction A1 is allowed, and the pulley 410 rotates in the first direction A1 while winding up the wire 490. When the external force applied to the body 1 in the bent direction is removed, the return spring 3 applies the elastic force to the body 1 in the direction in which the body 1 is transformed to the flat state. However, since the hook lever 440 is located at the locking position and hooked by the hooks 430, the pulley 410 may not rotate in the second direction A2. Therefore, the body 1 is maintained at the bent state. As such, the body 1 may be locked at variously bent states as denoted by (a), (b), (c), (d), (e), and (f) in FIG. 12. In order to transform the electronic device to the flat state, the hook lever 440 is switched to the unlock position from the hooks 430 by pushing the release button 460. Then, the body 1 is returned to the flat state by the elastic force of the return spring 3.

For example, the electronic device may be used in the flat state as denoted by (a) in FIG. 12. The flat state may be suitable for utilization states, for example, arrangement of a plurality of pictures in a lengthwise (L) direction, and display of information according to a timeline.

The electronic device may be used in a bent state with a predetermined curvature as denoted by (b) to (f) of FIG. 12. In addition, the electronic device may be a wearable device that may be worn on a human body, e.g., on a wrist, and in this case, the electronic device may be bent with an appropriate curvature for a thickness of the part wearing the electronic device, as denoted by (d), (e), and (f) of FIG. 12. Also, when the electronic device is installed on a handle such as a handle of a bike, a stroller, or a shopping cart, the electronic device may be bent with an appropriate curvature for the thickness of the portion where the electronic device is installed, as denoted by (d), (e), and (f) in FIG. 12.

As described above, the body 1 includes the controller for executing functions according to the usage of the electronic device, and electronic components such as a battery for supplying power. The electronic device according to various embodiments is switched to the flat state or to the bent state, and thus, the electronic components need to be arranged to be electrically connected to one another and to be annularly bent.

Figure 13:
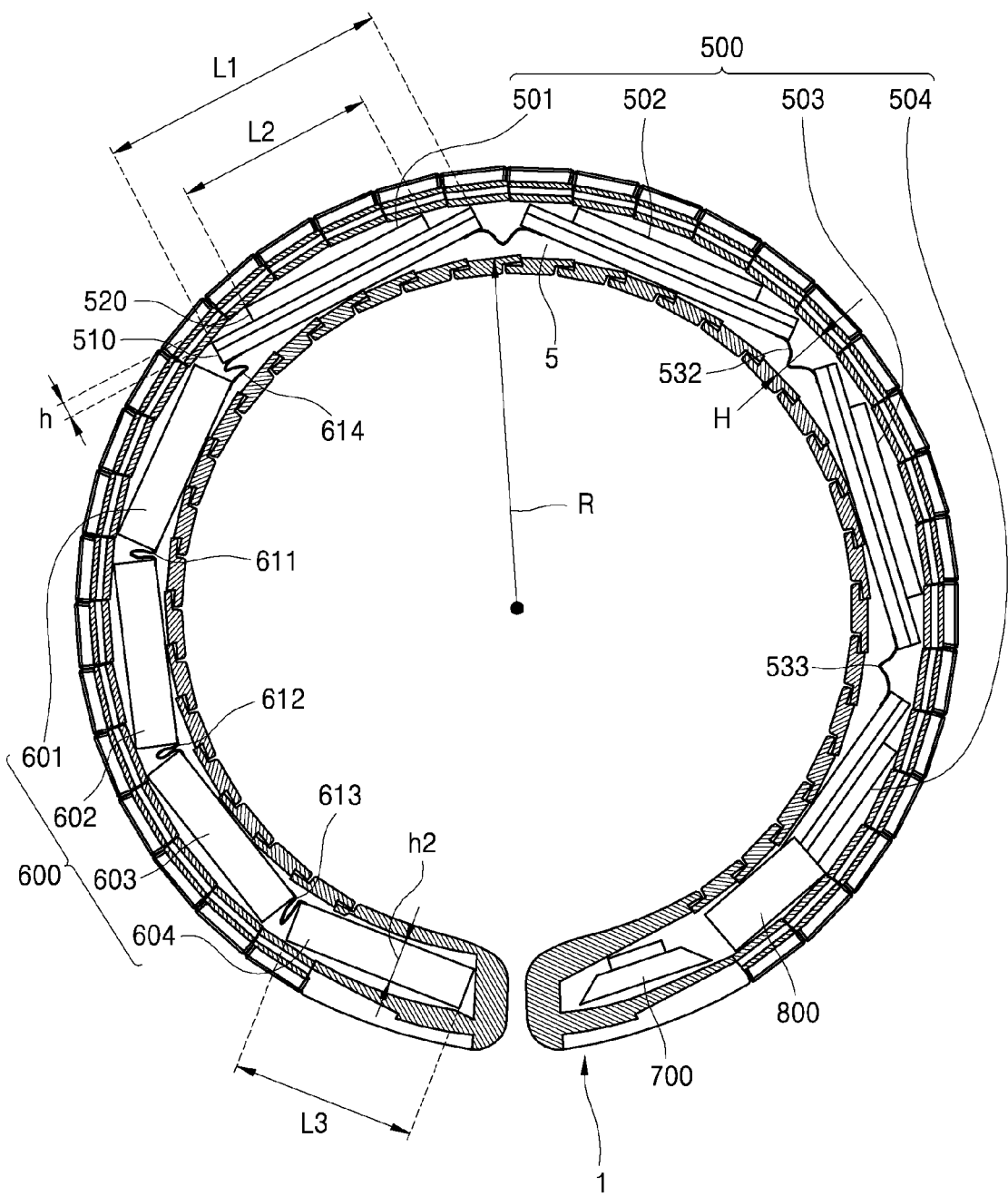
FIG. 13 is a schematic cross-sectional view of an electronic device according to an embodiment of the present disclosure.

FIG. 13 is a schematic cross-sectional view of an electronic device according to an embodiment of the present disclosure. In FIG. 13, the body 1 is in the annularly bent state.

Referring to FIG. 13, the body 1 includes an accommodation space 5 for accommodating the electronic components. Referring to FIG. 7, the accommodation space 5 may be formed by connecting segment accommodation portions 350 provided in the plurality of segment members 310 to each other. For example, each of the segment accommodation portions 350 may be formed by the top cover 100 and the bottom cover 200 coupled to each other from upper and lower directions. A bottom surface 105 of the top cover 100 and a top surface 205 of the bottom cover 200 are spaced apart from each other to form the segment accommodation portion 350.

The electronic components may include, for example, a controller 500 and a battery 600. The controller 500 may include a plurality of electric circuit portions 501, 502, 503, and 504. Each of the plurality of electric circuit portions 501, 502, 503, and 504 may include a printed circuit board (PCB) 510, and a circuit device 520 mounted on the PCB 510. A length L1 of the PCB 510, and a length L2 and a thickness h of a mounting region on which the circuit device 520 may be mounted may be determined taking into account an internal curvature R and a height H in a radial direction of the accommodation space 5 in a state where the body 1 is annularly bent. The plurality of electric circuit portions 501, 502, 503, and 504 are electrically connected to each other via electric connection members 531, 532, and 533 that are flexible. According to the above configuration, the controller 500 may be easily accommodated in the body 1 that is annularly bent.

The battery 600 may include one or more battery modules 601, 602, 603, and 604. The plurality of battery modules 601, 602, 603, and 604 may be electrically connected to one another via electric connection members 611, 612, and 613 that are flexible. A length L3 and a thickness h2 of each of the plurality of battery modules 601, 602, 603, and 604 may be determined by taking into account the internal curvature R and the height H in the radial direction of the accommodation space 5 in a state where the body 1 is annularly bent. The battery 600 may be connected to the controller 500, e.g., the electric circuit portion 501, via a flexible electric connection member 614. A capacity of the battery 600 is generally proportional to a size of the battery 600. According to the various embodiments, since the plurality of battery modules 601, 602, 603, and 604 are connected via the electric connection members 611, 612, and 613 that are flexible, the battery 600 having a desired capacity may be arranged in the body 1 of the electronic device that is annularly bent.

The electronic components may further include a speaker 700 for outputting sound, a vibrator 800 for notifying of receiving a call or of a touch input of the touch panel 22 integrated with the flexible display device 2, etc., in addition to the controller 500 and the battery 600 as described above. The speaker 700 and the vibrator 800 may be connected to the controller 500, e.g., the electric circuit portion 504, via a flexible electric connection member (not shown).

In the above described various embodiments, the flexible display device 2 covers the entire body 1, but is not limited thereto. That is, the flexible display device 2 may partially cover the body 1.

Figure 14:
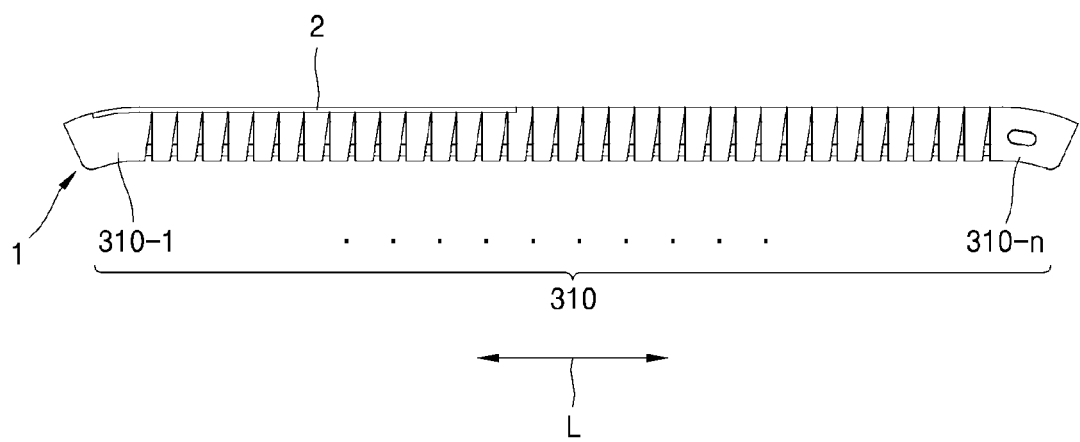
FIG. 14 is a schematic side view of a layout of a flexible display device according to an embodiment of the present disclosure.
Figure 15:
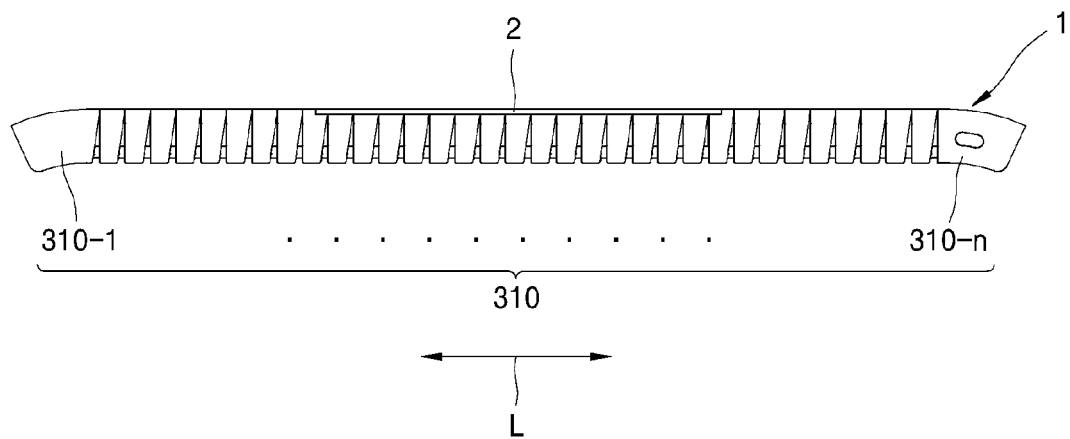
FIG. 15 is a schematic side view of a layout of a flexible display device according to an embodiment of the present disclosure.

FIGS. 14 and 15 are schematic side views of a layout of a flexible display device according to various embodiments of the present disclosure.

Referring to FIG. 14, the flexible display device 2 partially covers the body 1, and is biased to a side in the lengthwise direction L of the body 1. For example, the flexible display device 2 may be biased toward the first end segment member 310-1.

Referring to FIG. 15, the flexible display device 2 partially covers the body 1, and may be located at a center portion of the body 1 in the lengthwise direction L.

In the above-described embodiments, each of the segment members 310 has a length and a width that are equal to those of the others, but at least some of the segment members 310 may have the length and the width, at least of which is different from those of the other segment members 310.

Figure 16:
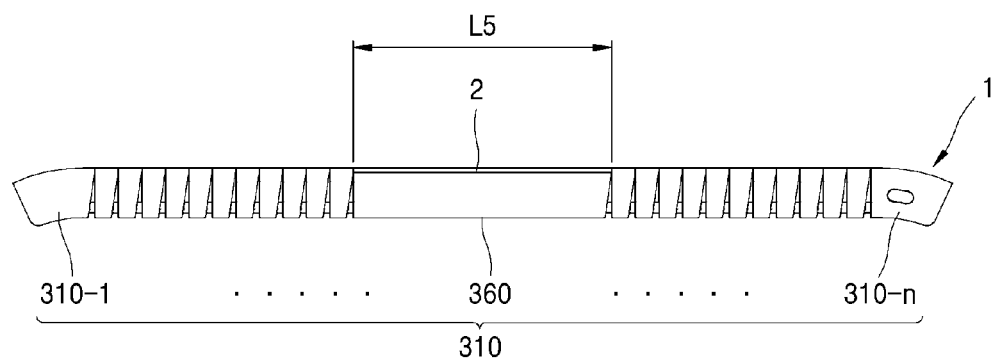
FIG. 16 is a schematic side view of an electronic device according to an embodiment of the present disclosure.
Figure 17:
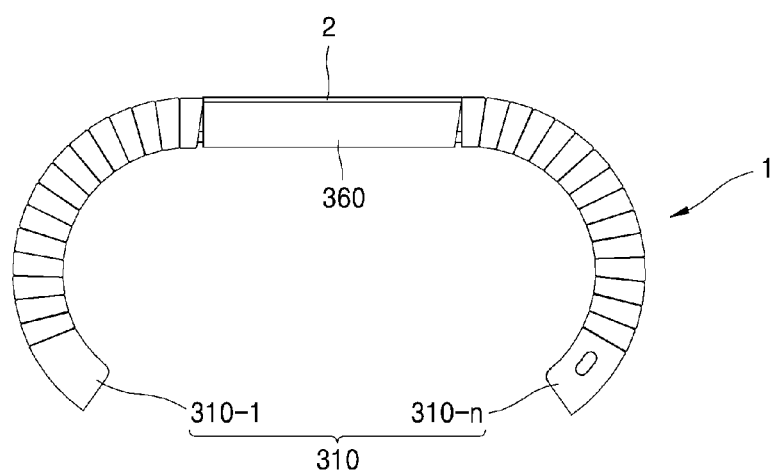
FIG. 17 is a side view of the electronic device of FIG. 16 in an annularly bent state according to an embodiment of the present disclosure.

FIG. 16 is a schematic side view of an electronic device according to an embodiment of the present disclosure. FIG. 17 is a side view of the electronic device of FIG. 16 in an annularly bent state according to an embodiment of the present disclosure.

Referring to FIG. 16, from among the plurality of segment members 310, a first segment member 360 is located at a center and has a length L5 that is longer than those of the other segment members 310. A width of the first segment member 360 is equal to those of the other segment members 310. A length of the flexible display device 2 may be equal to the length L5 of the first segment member 360, and the flexible display device 2 is supported by the first segment member 360. According to the above configuration, in a state where the body 1 is annularly bent as shown in FIG. 17, the plurality of segment members 310 except the first segment member 360 may function as a fixing band for fixing the first segment member 360 on a part of the human body or an installation portion of the device such as a bike on which the body 1 is installed. As shown in FIG. 17, even when the body 1 is annularly bent, the flexible display device 2 is not curved, but is supported flat by the first segment member 360, and thus, a flat screen may be implemented.

Figure 18:
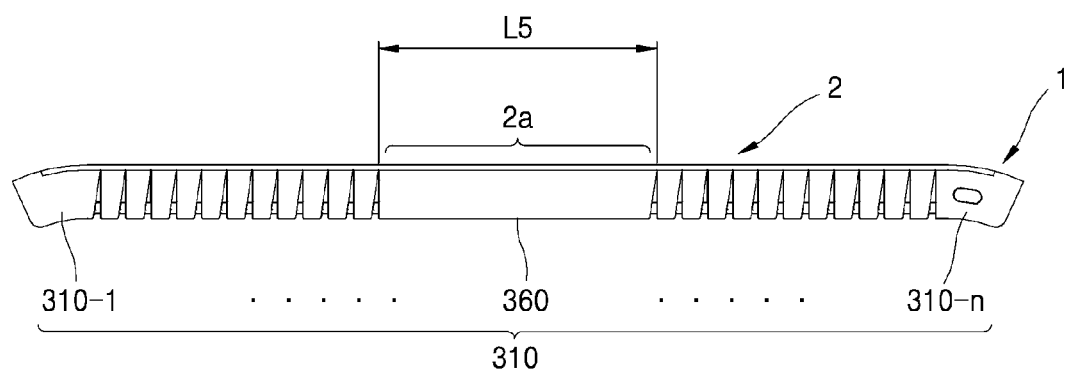
FIG. 18 is a schematic side view of an electronic device according to an embodiment of the present disclosure.

FIG. 18 is a schematic side view of an electronic device according to an embodiment of the present disclosure.

Referring to FIG. 18, the first segment member 360, from among the plurality of segment members 360, has the length L5 that is greater than those of the other segment members 310. The width of the first segment member 360 is equal to those of the other segment members 310. The flexible display device 2 is supported by the entire segment members 310. According to the above configuration, when the electronic device is annularly bent to be worn on a human body or installed on a bike or the like, a portion 2a of the flexible display device, which is supported by the first segment member 360, is flat. Therefore, the electronic device may ensure a partially flat screen.

Figure 19:
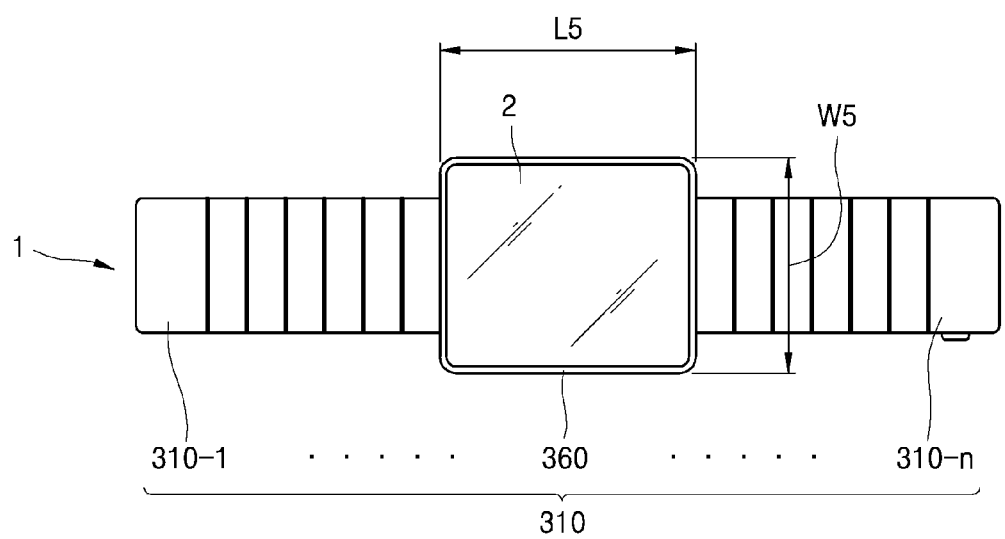
FIG. 19 is a schematic plan view of an electronic device according to an embodiment of the present disclosure.

FIG. 19 is a schematic plan view of an electronic device according to an embodiment of the present disclosure.

Referring to FIG. 19, the first segment member 360, from among the plurality of segment members 310, has the length L5 that is greater than those of the other segment members 310. A width W5 of the first segment member 360 is greater than those of the other segment members 310. The length and the width of the flexible display device 2 are equal to the length and the width of the first segment member 360, and the flexible display device 2 is supported by the first segment member 360. According to the above configuration, in a state where the body 1 is annularly bent, the plurality of segment members 310 except the first segment member 360 may function as a fixing band for fixing the first segment member 360 on a part of a human body or an installation portion of a bike on which the body 1 is installed. In a state where the body 1 is annularly bent, the flexible display device 2 is not curved, but is supported flat by the first segment member 360, and accordingly, a flat screen may be implemented.

Figure 20:
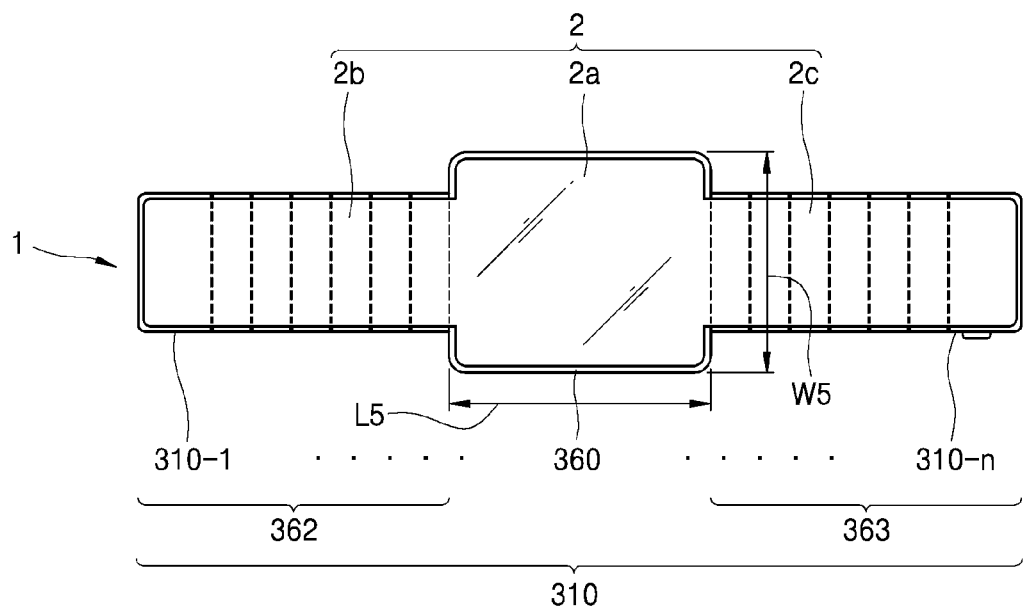
FIG. 20 is a schematic plan view of an electronic device according to an embodiment of the present disclosure.

FIG. 20 is a schematic plan view of an electronic device according to an embodiment of the present disclosure.

Referring to FIG. 20, the first segment member 360 is located at a center from among the plurality of segment members 310 and has the length L5 that is greater than those of the other segment members 310. The width W5 of the first segment member 360 is greater than those of the other segment members 310. The flexible display device 2 includes first to third devices 2a, 2b, and 2c. The first device 2a is supported by the first segment member 360, and a length and a width of the first device 2a may be equal to the length and the width of the first segment member 360. The second and third devices 2b and 2c are respectively supported by a plurality of second segment members 362 and a plurality of third segment members 363 at opposite sides of the first segment member 360. According to the above configuration, even in a state where the body 1 is annularly bent, the first device 4 is not bent, but is supported flat by the first segment member 360, and accordingly, a flat screen may be implemented. In addition, the second and third devices 2b and 2c are further provided such that an area of a display region may be increased. The first, second, and third devices 2a, 2b, and 2c may be separate devices, or may be an integrated device. In the latter case, the first, second, and third devices 2a, 2b, and 2c may be referred to as first, second, and third display regions 2a, 2b, and 2c of the flexible display device 2.

Figure 21:
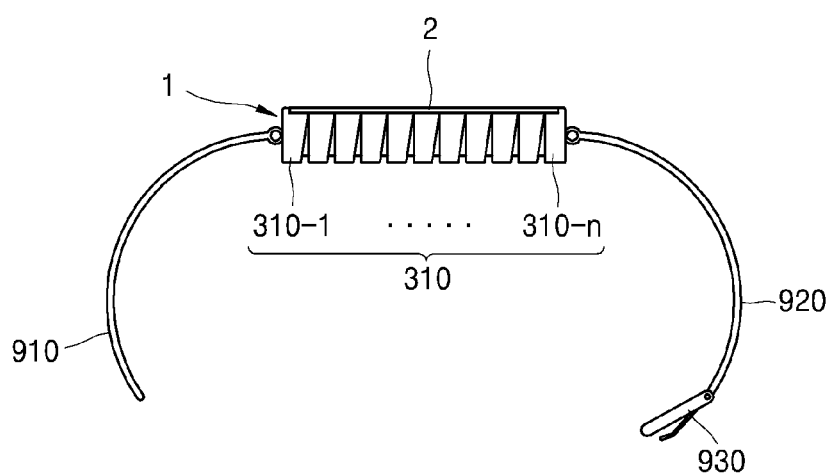
FIG. 21 is a schematic side view of an electronic device according to an embodiment of the present disclosure.
Figure 22:
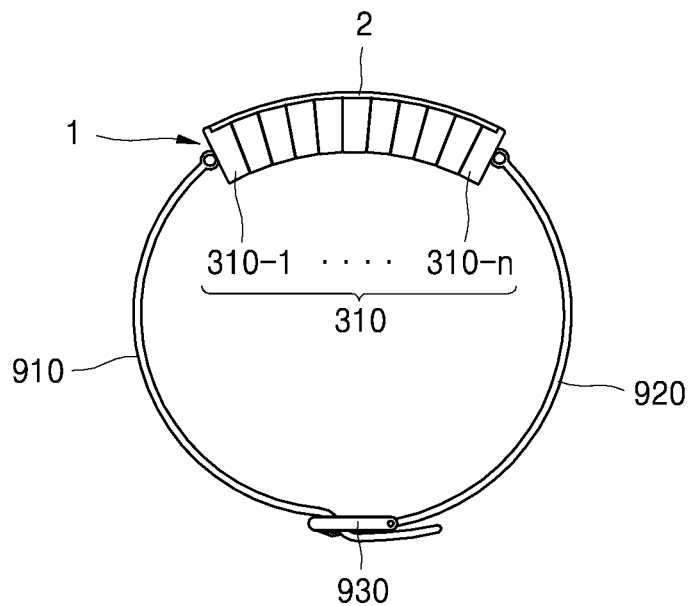
FIG. 22 is a schematic side view of the electronic device of FIG. 21 in an annularly bent state according to an embodiment of the present disclosure.

FIG. 21 is a schematic side view of an electronic device according to an embodiment of the present disclosure. FIG. 22 is a schematic side view of the electronic device of FIG. 21 in an annularly bent state according to an embodiment of the present disclosure.

Referring to FIG. 21, the electronic device includes the body 1, the flexible display device 2 supported by the body 1, and a fixing portion for fixing the body 1 on a wearing part or an installation portion. The fixing portion may include a first band 910 connected to, for example, the first end segment member 310-1, and a second band 920 connected to the second end segment member 310-n. The first band 910 or the second band 920 has a connection unit 930 at an end portion thereof to connect the first band 910 and the second band 920 to each other. The connection unit 930 may be, for example, a buckle. The first and second bands 910 and 920 may be, for example, leather bands, plastic bands, chain-shaped metal bands, etc.

Referring to FIG. 22, when the first and second bands 910 and 920 are connected to each other, the electronic device may be worn on a human body or installed on a bike, etc. Here, the body 1 is bent with a curvature.

Figure 23:
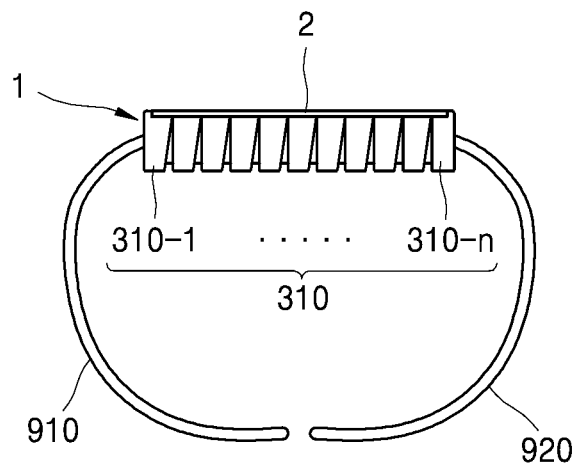
FIG. 23 is a schematic side view of an electronic device according to an embodiment of the present disclosure.
Figure 24:
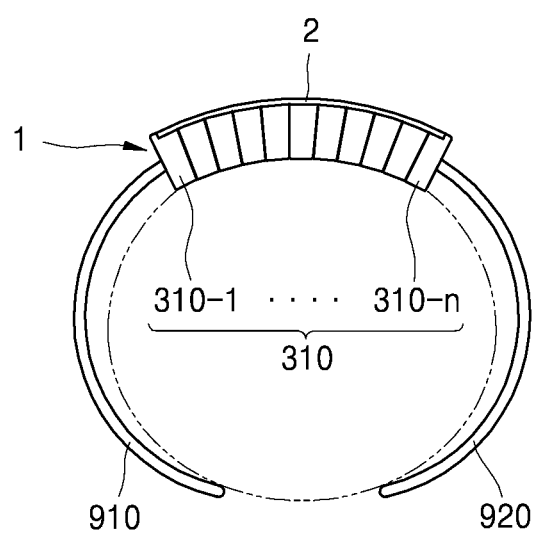
FIG. 24 is a schematic side view of the electronic device of FIG. 23 in an annularly bent state according to an embodiment of the present disclosure.

FIG. 23 is a schematic side view of an electronic device according to an embodiment of the present disclosure. FIG. 24 is a schematic side view of the electronic device of FIG. 23 in an annularly bent state according to an embodiment of the present disclosure.

Referring to FIG. 23, the first and second bands 910 and 920 may be elastically connected to the first and second end segment members 310-1 and 310-n. In a free state, the body 1 is in the flat state. When the electronic device is worn on a human body or installed on an installation portion, the first and second bands 910 and 920 are elastically widened with respect to the first and second end segment members 310-1 and 310-n to be elastically supported by the human body or the installation portion. The body 1 is bent to have a curvature as shown in FIG. 24.

It should be understood that various embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a body including a plurality of segment members that are connected to each other to be rotatable, the body being configured to switch to a flat state or a bent state by rotation of the plurality of segment members;
    a flexible display device supported by the body;
    a return spring for maintaining the body in the bent state with an elastic force so that the body returns to the flat state;
    a locking unit for locking the body at various bent states with different curvatures;

at least one processor configured to control the flexible display device, the at least one processor comprising a plurality of electric circuit devices electrically connected to each other via flexible electric connection members; and a battery for supplying power to the at least one processor, the battery comprising a plurality of battery modules that are electrically connected to each other via flexible electric connection members, wherein the locking unit locks the body at a bent state in which the flexible display device forms a convex display, and wherein the body comprises an accommodation space for accommodating the at least one processor and the battery.

2. The electronic device of claim 1, wherein the return spring includes an initial deformation amount when the body is in the flat state.

3. The electronic device of claim 1, wherein the return spring comprises a hyper-elastic material.

4. The electronic device of claim 1, wherein the accommodation space is formed by segment accommodation portions included in the plurality of segment members.

5. The electronic device of claim 1, further comprising:
a plurality of connecting members,
wherein the plurality of connecting members sequentially connect the plurality of segment members to be rotatable.

6. An electronic device comprising:
a body including a plurality of segment members that are connected to each other to be rotatable, the body being configured to switch to a flat state or a bent state by rotation of the plurality of segment members;
a flexible display device supported by the body;
a return spring for maintaining the body in the bent state with an elastic force so that the body returns to the flat state; and
a locking unit for locking the body at various bent states with different curvatures,
wherein the locking unit comprises:
a wire having an end portion connected to a first end segment member that is located at an end from among the plurality of segment members, the wire penetrating through the plurality of segment members to extend to a second end segment member that is located at another end from among the plurality of segment members, and
a pulley provided on the second end segment member, the pulley being rotatable so that another end portion of the wire is connected thereto, and
wherein the locking unit selectively allows the pulley to rotate in a direction of unwinding the wire to lock the body at the various bent states.

7. The electronic device of claim 6, wherein the locking unit further comprises:
a first elastic member for providing the pulley with an elastic force in a direction of winding up the wire;
a plurality of hooks provided on the pulley; and
a hook lever for switching between a locking position, on which the hook lever is hooked by the plurality of hooks to prevent the pulley from rotating in a direction of unwinding the wire, and an unlock position, on which the hook lever is released from the plurality of hooks.

8. The electronic device of claim 7, wherein the plurality of hooks switches the hook lever to the unlock position when the pulley rotates in a direction of winding up the wire.

9. The electronic device of claim 8, wherein the locking unit further comprises:
a second elastic member for providing the hook lever with an elastic force in a direction of locating the hook lever at the unlock position; and
a release button for switching the hook lever to the unlock position.

10. An electronic device comprising:
a body including a plurality of segment members that are connected to each other to be rotatable, the body being configured to switch to a flat state or a bent state by rotation of the plurality of segment members;
a flexible display device supported by the body;
a return spring for maintaining the body in the bent state with an elastic force so that the body returns to the flat state; and
a locking unit for locking the body at various bent states with different curvatures,
wherein the plurality of segment members comprises a first segment member, and a plurality of second segment members and a plurality of third segment members located at opposite sides of the first segment member, and
wherein at least one of a length and a width of the first segment member is greater than lengths or widths of the second and third segment members.

11. The electronic device of claim 10, wherein the flexible display device is supported by the first segment member.

12. The electronic device of claim 10, wherein the flexible display device comprises a first device, a second device, and a third device that are respectively supported by the first to third segment members.

13. An electronic device comprising:
a body including a plurality of segment members that are connected to each other to be rotatable, the body being configured to switch to a flat state or a bent state by rotation of the plurality of segment members;
a flexible display device supported by the body;
a return spring for maintaining the body in the bent state with an elastic force so that the body returns to the flat state; and
a locking unit for locking the body at various bent states with different curvatures,
wherein a first end segment member and a second end segment member, from among the plurality of segment members, are respectively located at opposite ends of the plurality of segment members, and
wherein the electronic device further comprises:
a first band and a second band for respectively connecting to the first end segment member and the second end segment member, and
a buckle for connecting the first band to the second band.

14. An electronic device comprising:
a body including a plurality of segment members that are connected to each other to be rotatable, the body being configured to switch to a flat state or a bent state by rotation of the plurality of segment members;
a flexible display device supported by the body;
a return spring for maintaining the body in the bent state with an elastic force so that the body returns to the flat state; and
a locking unit for locking the body at various bent states with different curvatures,
wherein a first end segment member and a second end segment member, from among the plurality of segment members, are respectively located at opposite ends of the plurality of segment members, wherein the electronic device further comprises a plurality of elastic bands respectively connected to the first end segment member and the second end segment member, and wherein the electronic device is elastically transformed.

\* \* \* \* \*